(12) United States Patent
Matson et al.

(10) Patent No.: US 9,422,111 B2
(45) Date of Patent: Aug. 23, 2016

(54) BUILDUP SHEDDING SPROCKET FOR DRIVING A WIRE CONVEYOR BELT

(71) Applicant: Wire Belt Company of America, Londonderry, NH (US)

(72) Inventors: Matt Matson, Bedford, NH (US); Shane Record, Salem, NH (US); Gerardo Martinez, Londonderry, NH (US)

(73) Assignee: Wire Belt Company of America, Londonderry, NH (US)

( * ) Notice: Subject to any disclaimer, the term of this patent is extended or adjusted under 35 U.S.C. 154(b) by 0 days.

(21) Appl. No.: 14/657,143

(22) Filed: Mar. 13, 2015

(65) Prior Publication Data

US 2015/0259150 A1    Sep. 17, 2015

Related U.S. Application Data

(60) Provisional application No. 61/953,113, filed on Mar. 14, 2014.

(51) Int. Cl.
*B65G 23/06* (2006.01)
*F16H 1/02* (2006.01)
*B23F 19/10* (2006.01)

(52) U.S. Cl.
CPC ............... *B65G 23/06* (2013.01); *B23F 19/10* (2013.01); *Y10T 409/101113* (2015.01)

(58) Field of Classification Search
CPC ............................... B65G 23/06; F16H 7/026
USPC ........................................................ 198/834
See application file for complete search history.

(56) References Cited

U.S. PATENT DOCUMENTS

| | | | |
|---|---|---|---|
| 6,367,613 B1 | 4/2002 | Montgomery | |
| 6,766,899 B1 * | 7/2004 | Guldenfels | B65G 17/08 198/834 |
| 7,370,749 B2 * | 5/2008 | Smith | B08B 3/022 198/495 |
| 7,407,051 B1 * | 8/2008 | Farris | B65G 45/22 134/131 |
| 7,451,891 B2 * | 11/2008 | Carter | G07F 11/165 221/210 |
| 7,604,113 B2 * | 10/2009 | Pluszynski | B65G 23/06 198/834 |
| 7,753,193 B2 * | 7/2010 | Kanaris | B65G 23/06 198/832 |
| 7,850,562 B2 * | 12/2010 | DeGroot | B65G 15/26 198/411 |
| 8,162,174 B2 * | 4/2012 | Hieb | G07F 11/165 221/122 |
| 8,739,966 B2 * | 6/2014 | Record | B65G 17/083 198/848 |
| 8,887,901 B2 * | 11/2014 | Cox | B65G 23/06 198/834 |
| 8,997,975 B2 * | 4/2015 | Lucchi | B65G 23/06 198/834 |
| 9,115,802 B2 * | 8/2015 | Guldenfels | B08B 3/02 |
| 2004/0222072 A1 | 11/2004 | Verdigets | |
| 2006/0084540 A1 | 4/2006 | Kanaris | |

FOREIGN PATENT DOCUMENTS

EP            2474486        11/2015
WO      WO2013126307         8/2013

OTHER PUBLICATIONS

ISR for PCT/US2015/20394.

* cited by examiner

*Primary Examiner* — Douglas Hess
(74) *Attorney, Agent, or Firm* — Davis & Bujold, P.L.L.C.; Kimberly A. Peaslee

(57) ABSTRACT

A method and apparatus for driving a wire conveyor belt with a buildup shedding sprocket. When driving a belt in any application in which material is added to articles on the belt, excess material accumulates on the support shelves between the sprocket teeth. A relief cut is made between the sprocket teeth providing a channel through which the excess material can be pushed away.

4 Claims, 4 Drawing Sheets

BUILDUP SHEDDING SPROCKET FOR DRIVING A WIRE CONVEYOR BELT

CROSS-REFERENCE TO RELATED APPLICATIONS

The present application claims the benefit of Provisional Patent Application Ser. No. 61/953,113 filed Mar. 14, 2014, which is incorporated herein by reference.

FIELD OF THE INVENTION

The present invention relates to a sprocket for driving a wire conveyor belt. In particular, it relates to a buildup shedding sprocket for driving a wire conveyor belt.

BACKGROUND OF THE INVENTION

Wire conveyor belts are commonly used for conveying articles during coating, cooking, cooling, drying and other applications. The wire conveyor belts are often driven by sprockets similar to the sprocket 10 shown in FIG. 1.

When driving a belt in a breading or battering application, or any application in which material is added to the articles on the belt, it is common for excess material to accumulate on the support shelves, commonly called roots, 14 between the sprocket teeth 12. The material will build up on the support shelves 14. Once enough material has built up on the support shelves 14, the conveyor belt will be pushed so far away from the center 15 of the sprocket that it will no longer make adequate contact with the sprocket teeth 12 for effective driving. The conveyor belt will begin to skip as the sprocket teeth 12 move past the belt instead of engaging it and driving it forward.

With the applications where buildup of material is an issue, it has long been known that the width 17 of the sprocket has an effect. The narrower the sprockets used, the less of a problem the buildup will be, and, conversely, the wider the sprockets used, the more of a problem buildup will be. The material, whether crumbs, batter, or other materials, cannot build up easily on a narrow sprocket but can easily build up on a wide sprocket.

While narrow sprockets are best for fighting material buildup, there are two significant problems with using a narrow sprocket. First, the narrower the sprocket teeth 12 pushing on a conveyor belt are, the higher the force is in that small area to push the belt. Higher, more concentrated forces wear the conveyor belt faster. The best way to drive the conveyor belt is with as wide sprocket teeth 12 as possible.

Second, when using a narrow sprocket, there is no good means of attaching it to a drive shaft. The simplest and cheapest method of attaching a sprocket to a drive shaft is to use a set screw in a threaded hole 16 in the sprocket to hold it tightly against a drive shaft. However, it is difficult to fit such a set screw into an extremely narrow sprocket. As is shown in FIG. 2, a hub 18 may be used on the side of a sprocket 10. The threaded hole 16 for the set screw is then placed in the hub 18, but such a hub is then subject to the same experience of buildup of material as a wide sprocket.

BRIEF DESCRIPTION OF THE DRAWINGS

These and other features and advantages of the present invention will be better understood by reading the following detailed description of preferred embodiments, taken together with the drawings wherein.

DETAILED DESCRIPTION OF PREFERRED EMBODIMENTS OF THE INVENTION

The present invention comprises a method and apparatus related to a buildup shedding sprocket for driving a wire conveyor belt.

Figure 1:
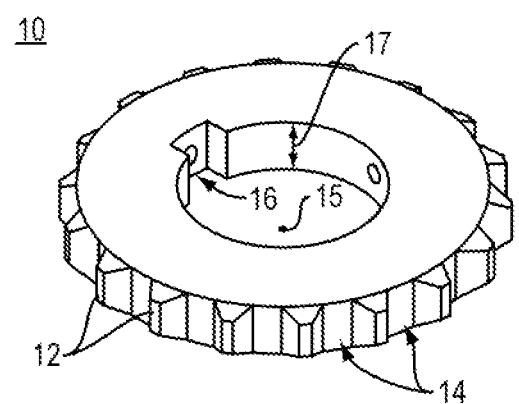
FIG. 1 is a schematic view of a sprocket for driving a wire conveyor belt in the prior art.
Figure 2:
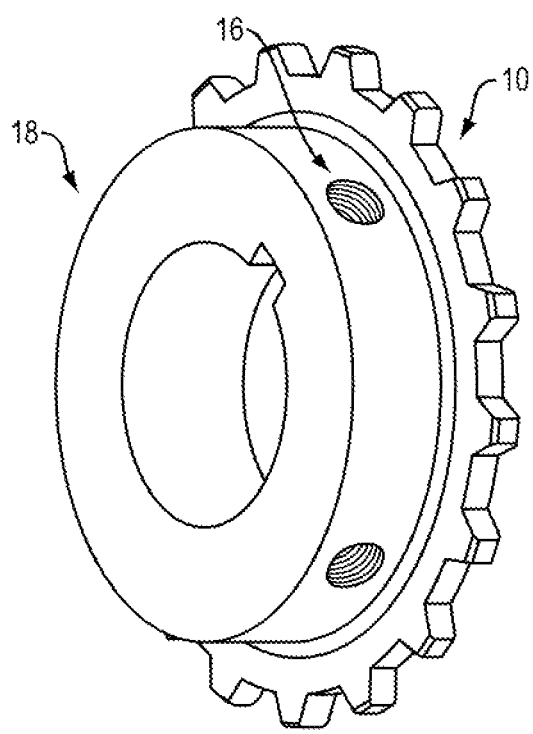
FIG. 2 is a schematic view of a second sprocket for driving a wire conveyor belt in the prior art.
Figure 3:
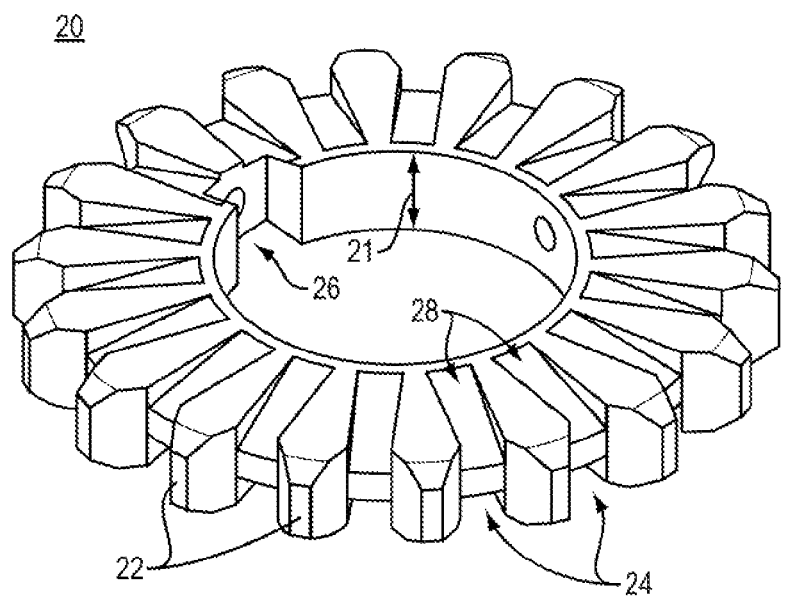
FIG. 3 is a schematic view of a preferred embodiment of the present invention.

As shown in FIG. 3, the sprocket 20 of a preferred embodiment of the present invention has relief cuts 28 between the sprocket teeth 22, providing channels through which material added to articles on a conveyor belt driven by the sprocket can be pushed away. The relief cuts produce support shelves 24 that are narrower than the width of the sprocket body 21 and the sprocket teeth 22, limiting the material build up. The sprocket 20 retains full width sprocket teeth 22 to drive a conveyor belt and a full width sprocket body 21. With full width sprocket teeth 22, a threaded hole 26 for a set screw can easily be located in one of the sprocket teeth 22 to fasten the sprocket 20 to a drive shaft.

The relief cuts 28 remove as much material from the sprocket 20 as possible, thereby making the support shelves as narrow as possible, without affecting the width of the driving faces of the sprocket teeth 22 where they contact a conveyor belt. In service, the conveyor belt will push material out of the way through the relief cuts 28 of the present invention, just as it pushes material off a narrow sprocket.

Figure 4:
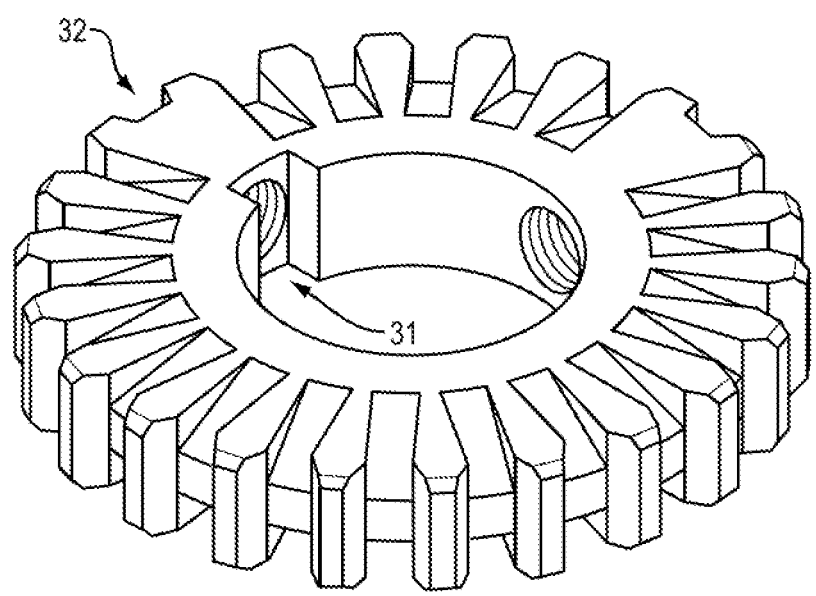
FIG. 4 is a schematic view of a second preferred embodiment of the present invention.

In another preferred embodiment of the present invention, as shown in FIG. 4, the sprocket 30 has threaded hole 31 for a set screw located in the center of a support shelf 32 in which the relief cut has been eliminated.

It should be noted that the diagrams contained herein show one face of a sprocket but the relief cuts described herein can be made on both faces of a sprocket.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

What is claimed is:

1. A buildup shedding sprocket for driving a wire conveyor belt comprising:
    a sprocket body with an inner diameter and an outer diameter and a thickness;
    a plurality of sprocket teeth wherein the sprocket teeth are a consistent thickness from the inner diameter to the outer diameter of the sprocket body; and
    a plurality of support shelves located between the sprocket teeth wherein the support shelves are angled such that the support shelves become thinner towards the outer diameter of the sprocket body.

2. The sprocket of claim 1 having a threaded hole for a set screw in one of the sprocket teeth.

3. The sprocket of claim 1 having a threaded hole for a set screw in a space located between two adjacent sprocket teeth wherein the space does not comprise one of the plurality of support shelves.

4. A method for producing a buildup shedding sprocket for driving a wire conveyor belt comprising
   providing a sprocket body having an inner diameter, an outer diameter and a thickness, where in the sprocket body comprises a plurality of sprocket teeth of the same thickness as the sprocket body;
   causing relief cuts to be made in the spaces between the plurality of sprocket teeth such that the spaces between the sprocket teeth are angled such that the spaces between the sprocket teeth become thinner towards the outer diameter of the sprocket body.

* * * * *